United States Patent
Stroud (10) Patent No.: US 10,479,235 B1
(45) Date of Patent: Nov. 19, 2019

(54) INFANT CAR SEAT WITH MASSAGING CAPABILITIES

(71) Applicant: Helen Stroud, Wallkill, NY (US)

(72) Inventor: Helen Stroud, Wallkill, NY (US)

(*) Notice: Subject to any disclaimer, the term of this patent is extended or adjusted under 35 U.S.C. 154(b) by 164 days.

(21) Appl. No.: 15/811,805

(22) Filed: Nov. 14, 2017

(51) Int. Cl.
*B60N 2/28* (2006.01)
*B60N 2/879* (2018.01)
*B60N 2/90* (2018.01)

(52) U.S. Cl.
CPC .............. *B60N 2/28* (2013.01); *B60N 2/879* (2018.02); *B60N 2/976* (2018.02)

(58) Field of Classification Search
CPC ........... B60N 2/28; B60N 2/879; B60N 2/976
USPC ...................................... 297/250.1
See application file for complete search history.

(56) References Cited

U.S. PATENT DOCUMENTS

| | | | |
|---|---|---|---|
| 4,979,777 A * | 12/1990 | Takada | B60N 2/2839 297/250.1 |
| 5,464,381 A * | 11/1995 | Wilson | A47D 9/02 297/184.13 |
| 5,482,352 A | 1/1996 | Leal | |
| 5,624,156 A * | 4/1997 | Leal | A47C 7/72 297/217.4 |
| 7,039,207 B1 | 5/2006 | Elrod | |
| 8,007,043 B1 | 8/2011 | Vuong | |
| D727,037 S | 4/2015 | Naslain | |
| 9,598,025 B1 * | 3/2017 | Scheppegrell | B60N 2/90 |
| 2005/0151401 A1 * | 7/2005 | Evans | B60N 2/26 297/250.1 |
| 2007/0040425 A1 | 2/2007 | Miles | |
| 2015/0042131 A1 | 2/2015 | Haas | |

\* cited by examiner

*Primary Examiner* — Mark R Wendell
(74) *Attorney, Agent, or Firm* — Kyle A. Fletcher, Esq.

(57) ABSTRACT

The infant car seat with massaging capabilities is adapted for use with a child. The infant car seat with massaging capabilities is configured for use in inducing a child to sleep. The infant car seat with massaging capabilities comprises a child safety seat, an electrical system, a plurality of vibrating motors, and a plurality of speakers. The electrical system, the plurality of vibrating motors, and the plurality of speakers are attached to the child safety seat. The child is placed in the child safety seat. The plurality of vibrating motors massage the child in a manner that soothes and relaxes the child. The plurality of speakers generate an audible sound that soothes and relaxes the child.

16 Claims, 5 Drawing Sheets

FIG. 6

INFANT CAR SEAT WITH MASSAGING CAPABILITIES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of medical and veterinary science including devices to induce sleep by use of a particular stimulus, more specifically, a device configured to induce sleep through the tactile and auditory senses.

Summary of Invention

The infant car seat with massaging capabilities is adapted for use with a child. The infant car seat with massaging capabilities is configured for use in inducing a child to sleep. The infant car seat with massaging capabilities comprises a child safety seat, an electrical system, a plurality of vibrating motors, and a plurality of speakers. The electrical system, the plurality of vibrating motors, and the plurality of speakers are attached to the child safety seat. The child is placed in the child safety seat. The plurality of vibrating motors massage the child in a manner that soothes and relaxes the child. The plurality of speakers generate an audible sound that soothes and relaxes the child.

These together with additional objects, features and advantages of the infant car seat with massaging capabilities will be readily apparent to those of ordinary skill in the art upon reading the following detailed description of the presently preferred, but nonetheless illustrative, embodiments when taken in conjunction with the accompanying drawings.

In this respect, before explaining the current embodiments of the infant car seat with massaging capabilities in detail, it is to be understood that the infant car seat with massaging capabilities is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the infant car seat with massaging capabilities.

It is therefore important that the claims be regarded as including such equivalent construction insofar as they do not depart from the spirit and scope of the infant car seat with massaging capabilities. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The infant car seat with massaging capabilities 100 (hereinafter invention) is adapted for use with a child 161. The child 161 refers to a young person who is placed in the child 161 safety seat 101 during use of the invention 100. The invention 100 is configured for use in inducing a child 161 to sleep. The invention 100 comprises a child 161 safety seat 101, an electrical system 102, a plurality of vibrating motors 103, and a plurality of speakers 104. The electrical system 102, the plurality of vibrating motors 103, and the plurality of speakers 104 are attached to the child 161 safety seat 101. The child 161 is placed in the child 161 safety seat 101. The plurality of vibrating motors 103 massage the child 161 in a manner that soothes and relaxes the child 161. The plurality of speakers generate an audible sound that soothes and relaxes the child 161.

In the first potential embodiment of the disclosure, it is anticipated that invention 100 will be made as a single integrated unit. Nevertheless, within this disclosure it will be assumed that the invention 100 is formed as a modification to a traditional child 161 safety seat 101. This assumption is made for the purposes of simplicity and clarity of exposition and is not intended to limit the scope of this disclosure. Those skilled in the mechanical arts will recognize that this simplifying assumption will not in any way limit the functionality of the invention 100 and should not be interpreted to in any way limit the scope of the claims.

The child 161 safety seat 101 is a safety device adapted for use in a vehicle. The child 161 safety seat 101 is adapted for use with a child 161. The child 161 safety seat 101 is a supplemental child 161 restraint system that is configured for use in a vehicle. The use of a child 161 safety seat 101 is well-known and documented in the United States. The child 161 safety seat 101 would ideally include a seatbelt or a restraining harness (not depicted) as required throughout the United States.

The child 161 safety seat 101 comprises a backrest cushion 111, a bench cushion 112, a left wing 113, and a right wing 114. The backrest cushion 111 is a padded structure. The backrest cushion 111 provides the back support for the child 161 while the child 161 is seated in the child 161 safety seat 101. A first sub-plurality of vibrating motors selected from the plurality of vibrating motors 103 is installed in the backrest cushion 111. The first sub-plurality of vibrating motors vibrates the backrest cushion 111 such that the back of the child 161 is massaged during operation of the invention 100.

The bench cushion 112 is a padded structure. The bench cushion 112 provides the back support for the buttocks of the child 161. A second sub-plurality of vibrating motors selected from the plurality of vibrating motors 103 is installed in the bench cushion 112. The second sub-plurality of vibrating motors vibrates the bench cushion 112 such that the buttocks of the child 161 is massaged during operation of the invention 100.

The left wing 113 is a rigid structure. The left wing 113 forms a barrier that protects the left side of the child 161 from impact injuries during an unfortunate event. The right wing 114 is a rigid structure. The right wing 114 forms a barrier that protects the left side of the child 161 from impact injuries during an unfortunate event.

The electrical system 102 is an electrical circuit that is used to power and to control the operation of the invention 100. The electrical system 102 comprises an audio source 120, a first potentiometer 121, a second potentiometer 122, a master switch 123, a battery 124, a diode 125, a charging port 126, and a housing 127. The electrical system 102 is further configured to work with an external power source 162. The external power source 162 further comprises a charging plug 163.

The audio source 120 is an electrical device that generates an electrical signal that is sent to the plurality of speakers 104. The plurality of speakers 104 uses the generated electrical signal to create an audible sound used to calm the child 161. The use of an audio source 120 is well-known and documented in the United States. The audio source 120 is discussed in greater detail elsewhere in this disclosure. The audio source 120 may be externally provided.

The first potentiometer 121 is an electrical device that controls the amount of electrical current flowing through an electrical circuit. The first potentiometer 121 controls the rate of vibration of each of the plurality of vibrating motors 103 by controlling the flow of electrical current through each of the plurality of vibrating motors 103. The second potentiometer 122 is an electrical device that controls the amount of electrical current flowing through an electrical circuit. The second potentiometer 122 controls the volume of each of the plurality of speakers 104 by controlling the flow of electrical current through each of the plurality of speakers 104. The use of potentiometers is well-known and documented in the electrical arts.

Figure 1:
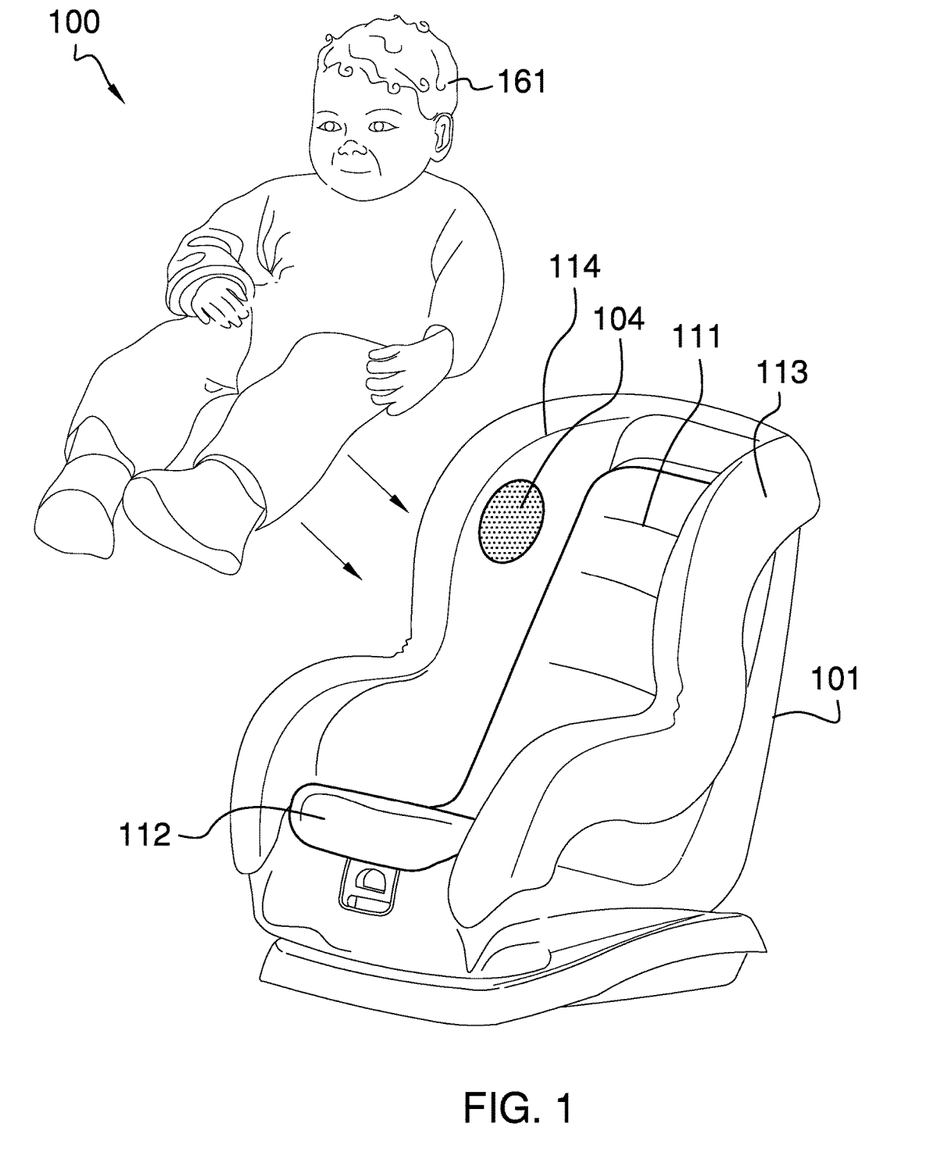
FIG. 1 is a perspective view of an embodiment of the disclosure.
Figure 2:
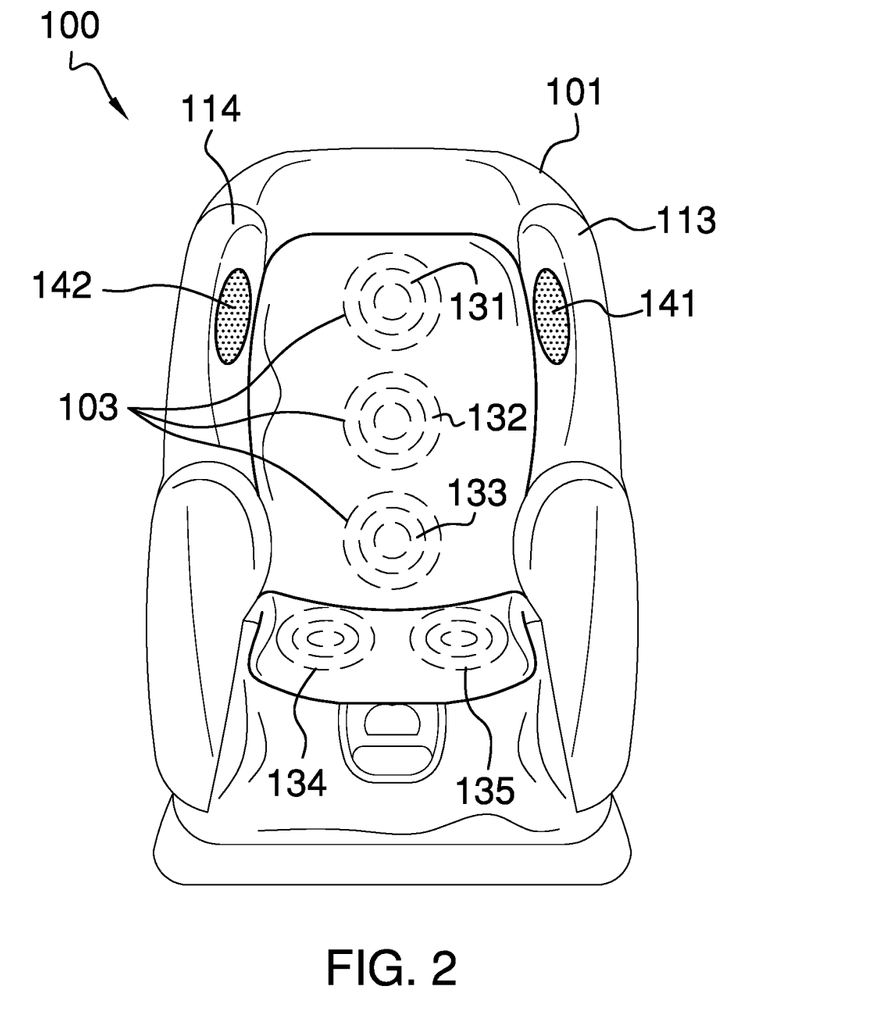
FIG. 2 is a front view of an embodiment of the disclosure.
Figure 3:
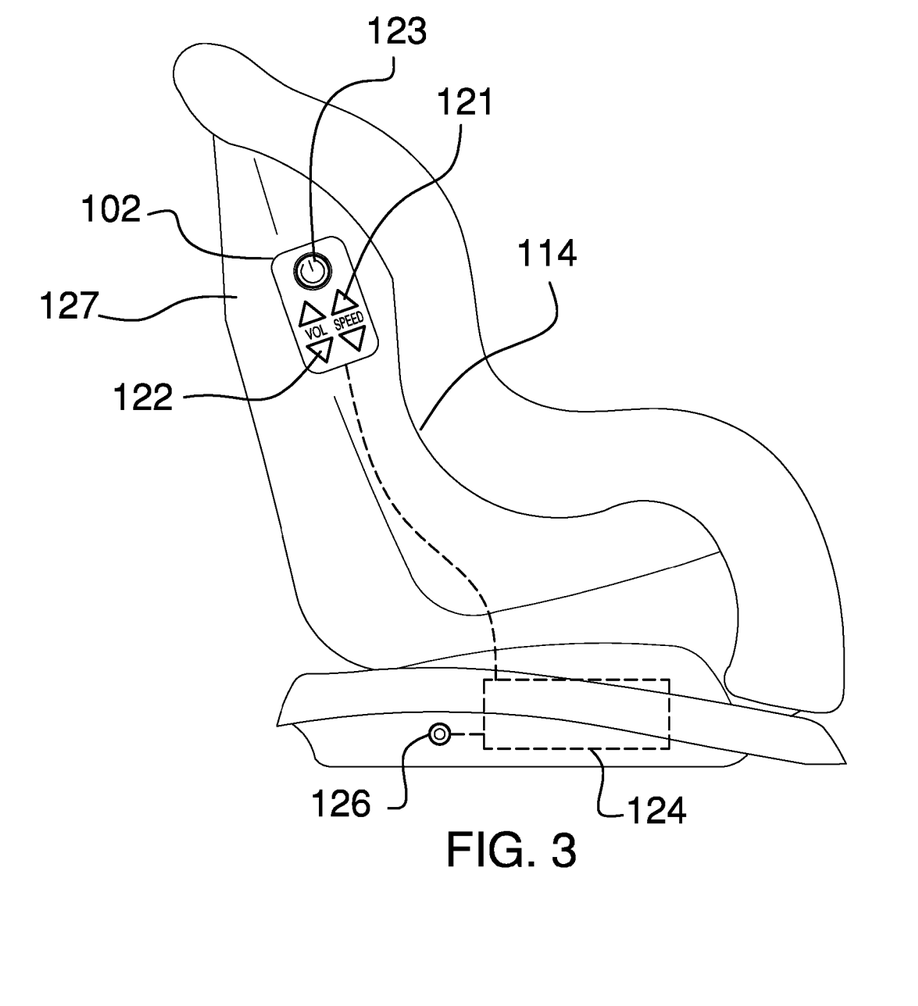
FIG. 3 is a side view of an embodiment of the disclosure.
Figure 4:
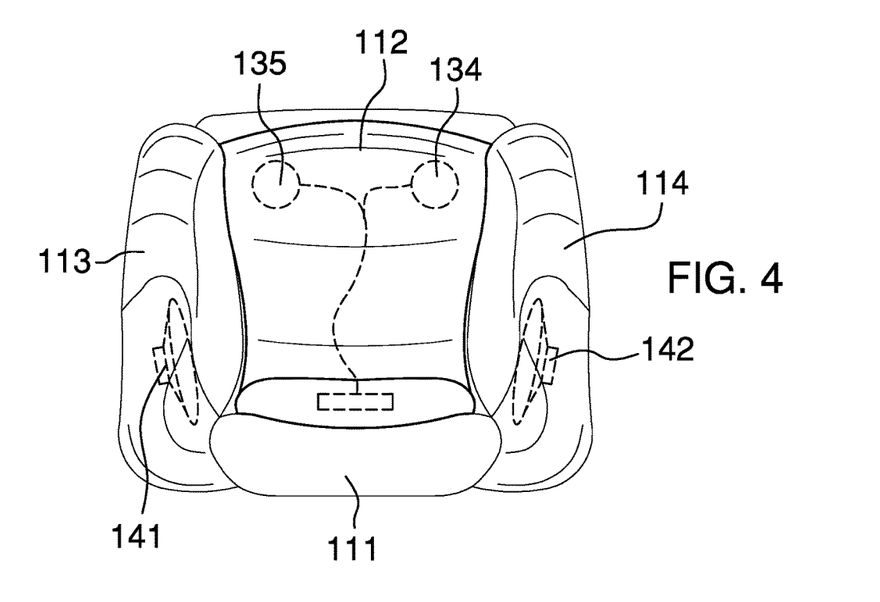
FIG. 4 is a top view of an embodiment of the disclosure.
Figure 5:
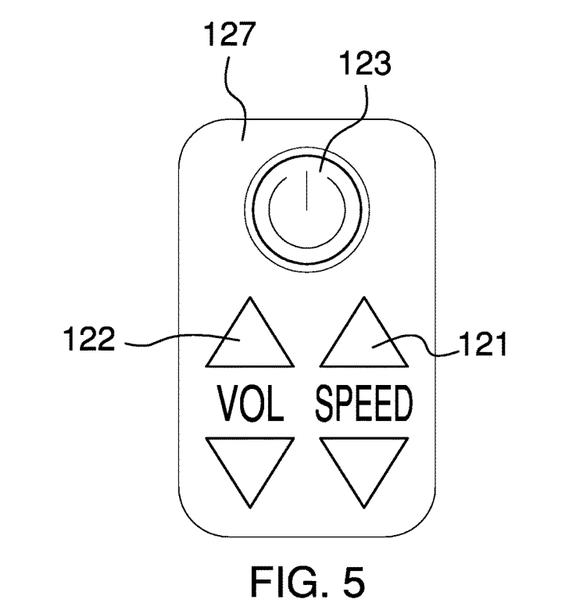
FIG. 5 is a detail view of an embodiment of the disclosure.
Figure 6:
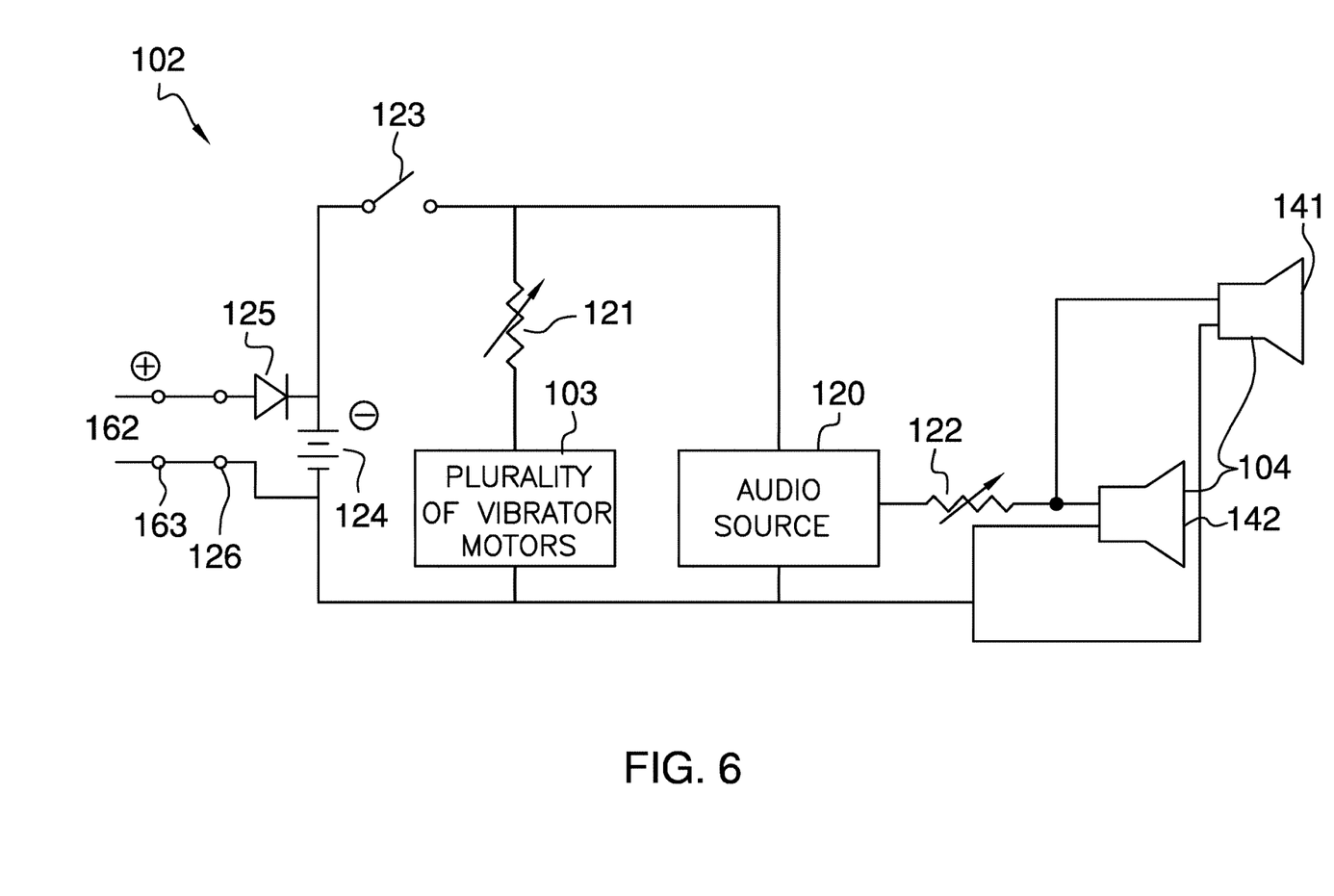
FIG. 6 is a schematic view of an embodiment of the disclosure.

As shown most clearly in FIG. 6, the master switch 123 is a maintained switch. The master switch 123 is placed in series between the battery 124 and both the first potentiometer 121 and the audio source 120. The master switch 123 controls the flow of electricity out of the battery 124 and operates as the on-off switch of the invention 100.

The battery 124 is a commercially available rechargeable battery 124. The chemical energy stored in the battery 124 is renewed and restored through the use of the charging port 126. The charging port 126 is an electrical circuit that reverses the polarity of the battery 124 and provides the energy necessary to reverse the chemical processes that the battery 124 initially used to generate the electrical energy. This reversal of the chemical process creates a chemical potential energy that will later be used by the battery 124 to generate electricity.

The charging port 126 attaches to the external power source 162 from which it draws electrical energy. The diode 125 is an electrical device that allows current to flow in only one direction. The diode 125 is installed between the battery 124 and the charging port 126 such that electricity will not flow from the positive terminal of the battery 124 to the positive terminal of the charging port 126. The external power source 162 connects to the charging port 126 using the charging plug 163. In the first potential embodiment of the disclosure, the external power source 162 and the charging port 126 are compatible with USB power requirements.

The housing 127 is a rigid casing within which contains the electrical system 102. The housing 127 is formed with all apertures and form factors necessary to allow the housing 127 to accommodate the use and operation of the electrical system 102. The housing 127 of the electrical system 102 attaches a wing selected from the group consisting of the left wing 113 and the right wing 114.

Each of the plurality of vibrating motors 103 is an electrical motor that generates a soothing vibration that is used to calm and relax the child 161. The operation of a vibrating motor is discussed in greater detail elsewhere in this disclosure.

In the first potential embodiment of the disclosure, the plurality of vibrating motors 103 comprises a first vibrating motor 131, a second vibrating motor 132, a third vibrating motor 133, a fourth vibrating motor 134, and a fifth vibrating motor 135. The first vibrating motor 131 is a commercially available vibrating motor. The second vibrating motor 132 is a commercially available vibrating motor. The third vibrating motor 133 is a commercially available vibrating motor. The first vibrating motor 131, the second vibrating motor 132, and the third vibrating motor 133 are identical. The fourth vibrating motor 134 is a commercially available vibrating motor. The fifth vibrating motor 135 is a commercially available vibrating motor. The fourth vibrating motor 134 and the fifth vibrating motor 135 are identical.

The first vibrating motor 131 is installed in the backrest cushion 111 of the child 161 safety seat 101. The second vibrating motor 132 is installed in the backrest cushion 111 of the child 161 safety seat 101. The third vibrating motor 133 is installed in the backrest cushion 111 of the child 161 safety seat 101. The fourth vibrating motor 134 is installed in the bench cushion 112 of the child 161 safety seat 101. The fifth vibrating motor 135 is installed in the bench cushion 112 of the child 161 safety seat 101.

The centers of the first vibrating motor 131, the second vibrating motor 132, and the third vibrating motor 133 are aligned in the superior-inferior direction along the spine of the child 161. The center of the fourth vibrating motor 134 is positioned directly under the right buttock of the child 161. The fifth vibrating motor 135 is positioned directly under the left buttock of the child 161.

Each of the plurality of speakers 104 is an electrically driven transducer that generates a soothing audible sound that is used to calm and relax the child 161. The operation of a speaker is discussed in greater detail elsewhere in this disclosure. In the first potential embodiment of the disclosure, the plurality of speakers 104 comprises a left speaker 141 and a right speaker 142. The left speaker 141 and the right speaker 142 are identical. The left speaker 141 is installed in the left wing 113 of the child 161 safety seat 101 next to the left ear of the child 161. The right speaker 142 is installed in the right wing 114 of the child 161 safety seat 101 next to the right ear of the child 161.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Audio Source: As used in this disclosure, an audio source is a device that generates electrical signals that can be converted into audible sounds by a speaker.

Battery: As used in this disclosure, a battery is a chemical device consisting of one or more cells, in which chemical energy is converted into electricity and used as a source of power.

Buttock: As used in this disclosure, the buttock refers to one of two rounded portions of the rump that: 1) in combination form the inferior region of the torso; and, 2) individually forms the superior region of a leg in a bipedal creature or the rear leg of a multi-legged creature. The buttock is often referred informally as the "butt."

Cushion: As used in this disclosure a cushion is a pad or pillow formed from a soft material that is used for resting, sleeping, or reclining.

Diode: As used in this disclosure, a diode is a two terminal semiconductor device that allows current flow in only one direction. The two terminals are called the anode and the cathode. Electric current is allowed to pass from the anode to the cathode.

Electric Motor: In this disclosure, an electric motor is a machine that converts electric energy into rotational mechanical energy.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Housing: As used in this disclosure, a housing is a rigid casing that encloses and protects one or more devices.

Inferior: As used in this disclosure, the term inferior refers to an edge or surface of an object that would commonly be referred to as the bottom of the object.

Maintained Switch: A used in this disclosure, a maintained switch is a switch that maintains the position that was set in the most recent switch actuation. A maintained switch works in an opposite manner to a momentary switch.

Motor: As used in this disclosure, a motor refers to the method of transferring energy from an external power source into mechanical energy.

Pad: As used in this disclosure, a pad is a mass of soft material used as a filling or for protection against damage or injury. Commonly used padding materials include, but are not limited to, polyurethane foam, silicone, a polyester fill often referred to as fiberfill or polystyrene beads often referred to as stuffing beans or as bean bag chair beans.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Potentiometer: As used in this disclosure, a potentiometer is an adjustable electrical device that presents a resistance to a voltage. The level of resistance is adjustable.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Rigid Structure: As used in this disclosure, a rigid structure is a solid structure formed from an inelastic material that resists changes in shape. A rigid structure will permanently deform as it fails under a force.

Speaker: As used in this disclosure, a speaker is an electrical transducer that converts an electrical signal into an audible sound.

Superior: As used in this disclosure, the term superior refers to an edge or surface of an object that would commonly be referred to as the top of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Terminal: As used in this disclosure, a terminal is the end point of a conductor. A terminal can be the conducting wire itself or may have attached to is a device designed to facilitate an electrical connection.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Transducer: As used in this disclosure, a transducer is a device that converts a physical quantity, such as pressure or brightness into an electrical signal or a device that converts an electrical signal into a physical quantity.

Unfortunate Event: As used in this disclosure, an unfortunate event is an incident that: 1) happens unexpectedly; 2) happens unintentionally; and, 3) has the potential to cause injury and or property damage.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

Vibration Motor: As used in this disclosure, a vibration motor is an electric motor that rotates an unbalanced weight in such a manner that the electric motor vibrates during operation. The vibration can be varied by varying the rotational speed of the vibration motor. The rotational speed is varied by varying the electric current flowing through the vibration motor.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A sleep inducing device comprising:
a child safety seat, an electrical system, a plurality of vibrating motors, and a plurality of speakers;
wherein the electrical system, the plurality of vibrating motors, and the plurality of speakers are attached to the child safety seat;
wherein the sleep inducing device is adapted for use with a child;
wherein the sleep inducing device is configured for use in inducing the child to sleep;
wherein the child is placed in the child safety seat;
wherein the plurality of vibrating motors massage the child;
wherein the plurality of speakers generate an audible sound;
wherein the child safety seat is a safety device;
wherein the child safety seat is configured for use in a vehicle;
wherein the child safety seat is adapted for use with the child;
wherein the electrical system is an electrical circuit;
wherein the electrical system powers and controls the operation of the sleep inducing device;
wherein each of the plurality of vibrating motors vibrates in response to an electric current;
wherein each of the plurality of speakers is an electrical transducer;
wherein the child safety seat comprises a backrest cushion, a bench cushion, a left wing, and a right wing;
wherein the backrest cushion is a padded structure;
wherein the bench cushion is a padded structure;
wherein the left wing is a rigid structure;
wherein the left wing forms a barrier;
wherein the right wing is a rigid structure;
wherein the right wing forms a barrier;
wherein a first sub-plurality of vibrating motors selected from the plurality of vibrating motors is installed in the backrest cushion;
wherein a second sub-plurality of vibrating motors selected from the plurality of vibrating motors is installed in the bench cushion;
wherein the first sub-plurality of vibrating motors vibrates the backrest cushion;
wherein the second sub-plurality of vibrating motors vibrates the bench cushion;
wherein the electrical system comprises an audio source, a first potentiometer, a second potentiometer, a master switch, a battery, a diode, a charging port, and a housing;
wherein the audio source, the first potentiometer, the second potentiometer, the master switch, the battery, the diode, and the charging port are contained within the housing;
wherein the audio source, the first potentiometer, the second potentiometer, the master switch, the battery, the diode, and the charging port are electrically interconnected.

2. The sleep inducing device according to claim 1
wherein the audio source is an electrical device;
wherein the audio source generates an electrical signal that is sent to the plurality of speakers;
wherein the plurality of speakers uses the generated electrical signal to create an audible sound.

3. The sleep inducing device according to claim 2
wherein the first potentiometer is an electrical device;
wherein the first potentiometer controls the amount of electrical current flowing through each of the plurality of vibrating motors.

4. The sleep inducing device according to claim 3
wherein the second potentiometer is an electrical device;
wherein the second potentiometer controls the volume of each of the plurality of speakers by controlling the amount of electrical current flowing through each plurality of speakers.

5. The sleep inducing device according to claim 4 wherein the master switch is a maintained switch;
wherein the master switch is placed in series between the battery and the first potentiometer;
wherein the master switch is placed in series between the battery and the audio source.

6. The sleep inducing device according to claim 5
wherein the electrical system is further configured to work with an external power source;
wherein the external power source further comprises a charging plug;
wherein the charging plug electrically connects the external power source to the charging port.

7. The sleep inducing device according to claim 6
wherein the battery is a rechargeable battery;
wherein the charging port is an electrical circuit;
wherein the charging port reverses the polarity of the battery.

8. The sleep inducing device according to claim 7
wherein the diode is an electrical device that allows current to flow in only one direction;
wherein the diode is installed between the battery and the charging port such that electricity will not flow from a positive terminal of the battery to a positive terminal of the charging port.

9. The sleep inducing device according to claim 8
wherein the housing is a casing;
wherein the housing attaches a wing selected from the group consisting of the left wing and the right wing.

10. The sleep inducing device according to claim 9
wherein each of the plurality of vibrating motors is an electrical motor;
wherein each of the plurality of vibrating motors vibrates when an electric current flows through the electrical motor;

wherein the level of vibration generated by any vibrating motor selected from the plurality of vibrating motors is a function of the electric current flowing through the selected vibrating motor.

11. The sleep inducing device according to claim 10
wherein the plurality of vibrating motors comprises a first vibrating motor, a second vibrating motor, a third vibrating motor, a fourth vibrating motor, and a fifth vibrating motor;
wherein the first vibrating motor is installed in the backrest cushion of the child safety seat;
wherein the second vibrating motor is installed in the backrest cushion of the child safety seat;
wherein the third vibrating motor is installed in the backrest cushion of the child safety seat;
wherein the fourth vibrating motor is installed in the bench cushion of the child safety seat;
wherein the fifth vibrating motor is installed in the bench cushion of the child safety seat.

12. The sleep inducing device according to claim 11
wherein the centers of the first vibrating motor, the second vibrating motor, and the third vibrating motor are aligned in the superior-inferior direction along the spine of the child;
wherein the center of the fourth vibrating motor is positioned directly under the right buttock of the child;
wherein the fifth vibrating motor is positioned directly under the left buttock of the child;
wherein the first vibrating motor, the second vibrating motor, and the third vibrating motor are identical;
wherein the fourth vibrating motor and the fifth vibrating motor are identical.

13. The sleep inducing device according to claim 12
wherein the plurality of speakers comprises a left speaker and a right speaker;
wherein the left speaker and the right speaker are identical;
wherein the left speaker is installed in the left wing of the child safety seat next to the left ear of the child;
wherein the right speaker is installed in the right wing of the child safety seat next to the right ear of the child.

14. The sleep inducing device according to claim 1
wherein the audio source is an electrical device;
wherein the audio source generates an electrical signal that is sent to the plurality of speakers;
wherein the plurality of speakers uses the generated electrical signal to create an audible sound;
wherein the first potentiometer is an electrical device;
wherein the first potentiometer controls the amount of electrical current flowing through each of the plurality of vibrating motors;
wherein the second potentiometer is an electrical device;
wherein the second potentiometer controls the volume of each of the plurality of speakers by controlling the amount of electrical current flowing through each plurality of speakers;
wherein the master switch is placed in series between the battery and the first potentiometer;
wherein the master switch is placed in series between the battery and the audio source;
wherein the electrical system is further configured to work with an external power source;
wherein the external power source further comprises a charging plug;
wherein the charging plug electrically connects the external power source to the charging port;
wherein the battery is a rechargeable battery;
wherein the charging port is an electrical circuit;
wherein the charging port reverses the polarity of the battery;
wherein the diode is an electrical device that allows current to flow in only one direction;
wherein the diode is installed between the battery and the charging port such that electricity will not flow from a positive terminal of the battery to a positive terminal of the charging port;
wherein the housing is a casing.

15. The sleep inducing device according to claim 14
wherein each of the plurality of vibrating motors is an electrical motor;
wherein each of the plurality of vibrating motors vibrates when an electric current flows through the electrical motor;
wherein the level of vibration generated by any vibrating motor selected from the plurality of vibrating motors is a function of the electric current flowing through the selected vibrating motor;
wherein the plurality of vibrating motors comprises a first vibrating motor, a second vibrating motor, a third vibrating motor, a fourth vibrating motor, and a fifth vibrating motor;
wherein the first vibrating motor, the second vibrating motor, and the third vibrating motor are identical;
wherein the fourth vibrating motor and the fifth vibrating motor are identical;
wherein the plurality of speakers comprises a left speaker and a right speaker;
wherein the left speaker and the right speaker are identical.

16. The sleep inducing device according to claim 15
wherein the child safety seat comprises a backrest cushion, a bench cushion, a left wing, and a right wing;
wherein the backrest cushion is a padded structure;
wherein the bench cushion is a padded structure;
wherein the left wing is a rigid structure;
wherein the left wing forms a barrier;
wherein the right wing is a rigid structure;
wherein the right wing forms a barrier;
wherein the first vibrating motor is installed in the backrest cushion of the child safety seat;
wherein the second vibrating motor is installed in the backrest cushion of the child safety seat;
wherein the third vibrating motor is installed in the backrest cushion of the child safety seat;
wherein the fourth vibrating motor is installed in the bench cushion of the child safety seat;
wherein the fifth vibrating motor is installed in the bench cushion of the child safety seat;
wherein the centers of the first vibrating motor, the second vibrating motor, and the third vibrating motor are aligned in the superior-inferior direction along the spine of the child;
wherein the center of the fourth vibrating motor is positioned directly under the right buttock of the child;
wherein the fifth vibrating motor is positioned directly under the left buttock of the child;
wherein the left speaker is installed in the left wing of the child safety seat;
wherein the right speaker is installed in the right wing of the child safety seat.

* * * * *